United States Patent
Higuchi

(10) Patent No.: US 8,470,484 B2
(45) Date of Patent: Jun. 25, 2013

(54) FUEL CELL SYSTEM

(75) Inventor: Taneo Higuchi, Oumi (JP)

(73) Assignee: Kyocera Corporation, Kyoto (JP)

( * ) Notice: Subject to any disclaimer, the term of this patent is extended or adjusted under 35 U.S.C. 154(b) by 909 days.

(21) Appl. No.: 12/092,059

(22) PCT Filed: Oct. 31, 2006

(86) PCT No.: PCT/JP2006/321706
§ 371 (c)(1),
(2), (4) Date: Dec. 3, 2008

(87) PCT Pub. No.: WO2007/052633
PCT Pub. Date: May 10, 2007

(65) Prior Publication Data
US 2009/0297900 A1    Dec. 3, 2009

(30) Foreign Application Priority Data
Oct. 31, 2005  (JP) .................................. 2005-317413

(51) Int. Cl.
*H01M 8/04*  (2006.01)
(52) U.S. Cl.
USPC ........................... 429/443; 429/428; 429/437
(58) Field of Classification Search
USPC .................... 429/423, 428, 437, 443
See application file for complete search history.

(56) References Cited

U.S. PATENT DOCUMENTS

| | | | |
|---|---|---|---|
| 2003/0228501 A1* | 12/2003 | Champion et al. | 429/12 |
| 2005/0061003 A1* | 3/2005 | Miyauchi et al. | 60/691 |
| 2005/0164056 A1* | 7/2005 | Tanaka et al. | 429/24 |

FOREIGN PATENT DOCUMENTS

| | | |
|---|---|---|
| JP | 01320773 A | 12/1989 |
| JP | 2001185197 A | 7/2001 |
| JP | 2002-042841 | 2/2002 |
| JP | 2004362800 A | 12/2004 |
| JP | 2005-005213 | 1/2005 |
| JP | 2005-291615 | 10/2005 |
| JP | 2005-337516 | 12/2005 |

OTHER PUBLICATIONS

English translation of Japanese office action dated Apr. 17, 2012 issued in corresponding Japanese application 2007542756 cites the foreign patent documents above.

* cited by examiner

*Primary Examiner* — Ula C Ruddock
*Assistant Examiner* — Frank Chernow
(74) *Attorney, Agent, or Firm* — DLA Piper LLP (US)

(57) ABSTRACT

A fuel cell system capable of stably supplying hot water to a load is provided.
The fuel cell system includes a solid-oxide fuel cell 31, a heat exchanger 40 that exchanges heat between an exhaust gas from the solid-oxide fuel cell 31 and water, a hot water storage tank 42 that reserves the water, circulation pipes 43a and 43b for circulating the water between the hot water storage tank 42 and the heat exchanger 40, and a circulation pump 41 provided to the circulation pipes 43a and 43b. The fuel cell system is provided with a controller 39 that controls the fuel utilization ratio during power generation by the solid-oxide fuel cell 31 in accordance with the used amount of reserved hot water.

10 Claims, 3 Drawing Sheets

FUEL CELL SYSTEM

BACKGROUND OF THE INVENTION

1. Field of the Invention

The present invention relates to a fuel cell system utilizing a solid-oxide fuel cell, in particular to a fuel cell system capable of variably controlling the fuel utilization ratio.

2. Description of the Related Art

A control method of a conventional polymer electrolyte fuel cell system is described. FIG. 3 shows a conventional polymer electrolyte fuel cell system. As illustrated in FIG. 3, when the fuel cell system is operated, a fuel processing device 14 reforms a material such as natural gas using steam to generate a gas containing hydrogen as a main component. The gas is humidified by a hydrogen-side humidifier 11 and supplied to a fuel cell 1. Also, an air-supply device 3 supplies air as an oxidation gas to an oxidation-side humidifier 13, and the oxidation gas is humidified thereby and supplied to the fuel cell 1. The fuel cell 1 is connected to a power conditioner 6 that converts generated DC power to AC power. The power conditioner 6 is connected to an electric power system 7 and an electrical load 8.

The heat which is generated by the fuel cell 1 accompanying the power generation is recovered by cooling water flowing in a cooling pipe 19. The cooling water is circulated by a cooling water circulation pump 16 and the heat recovered by the cooling water is transferred to water which is circulated by a pump 17 in an exhaust heat recovery pipe 20 through a heat exchanger 15. Thus, hot water is reserved in a hot water storage tank 12 (refer to, for example, Japanese Unexamined Patent Publication (Kokai) No. 2002-42841).

The polymer electrolyte fuel cell is characterized in that the exhaust heat recovery efficiency is higher than the power generation efficiency. Therefore, in ordinary operation, the temperature of water is swiftly increased and the hot water storage tank is easily filled with hot water. In such a case, in view of the efficiency of the system that the exhaust heat recovery efficiency is higher, the power generation operation is suspended.

Also, the polymer electrolyte fuel cell is characterized in that city gas as a main fuel is reformed to generate hydrogen and carbon monoxide. Although the generated carbon monoxide is removed, there is a problem that considerable time is required to remove the carbon monoxide. Therefore, the fuel is hardly reformed swiftly corresponding to the power generation amount and/or temperature changes. Consequently, the fuel utilization ratio is controlled extremely slowly.

To solve the above-mentioned disadvantage, an exhaust heat recovery system for a polymer electrolyte fuel cell system has been developed. However, no exhaust heat recovery system has been proposed for a solid-oxide fuel cell system. Since an electrolyte is different from a solid electrolyte, the control relevant to the exhaust heat recovery for the polymer electrolyte fuel cell system cannot be applied to the solid-oxide fuel cell system as is.

The solid-oxide fuel cell is characterized in that the power generation efficiency is higher than the exhaust heat recovery efficiency. In view of electric power supply to the electrical load, the solid-oxide fuel cell is superior to the polymer electrolyte fuel cell. However, in view of stable supply of hot water to a load to be supplied therewith, the solid-oxide fuel cell has a disadvantage that the absolute suppliable amount of hot water is small.

SUMMARY OF THE INVENTION

The present invention is proposed in view of the above problems. It is an object of the invention to provide a fuel cell system capable of stably supplying hot water to a load to be supplied therewith.

In order to solve the above problems, the invention has the following characteristics.

A fuel cell system according to the invention includes a solid-oxide fuel cell; a heat exchanger that exchanges heat between exhaust gas from the solid-oxide fuel cell and water; a hot water storage tank that reserves the water; circulation pipes that allow the water to circulate between the hot water storage tank and the heat exchanger; a circulation pump provided to the circulation pipes, and controller controlling the fuel utilization ratio of the solid-oxide fuel cell in accordance with the used amount of hot water in the hot water storage tank during power generation operation.

Also, a fuel cell system includes a solid-oxide fuel cell; a heat exchanger that exchanges heat between exhaust gas from the solid-oxide fuel cell and water; a hot water storage tank that reserves the water; circulation pipes that allows the water to circulate between the hot water storage tank and the heat exchanger; a circulation pump provided to the circulation pipes, and controller controlling the fuel utilization ratio of the solid-oxide fuel cell in accordance with the ratio or temperature of hot water in the hot water storage tank during power generation operation.

The fuel cell system has a controller that controls the supply amount of fuel gas in accordance with the amount of hot water supplied to the user to thereby change the fuel utilization ratio by the fuel cell. For example, in the case where a large amount of hot water is required or when the ratio of hot water in the hot water storage tank is small, the fuel utilization ratio is lowered irrespective of the level of the electrical load. Thereby, the energy amount of the exhaust gas generated by the fuel cell is increased; and thus, the amount of hot water generated by the heat exchanger is increased. As a result, the storage amount (ratio of hot water in the hot water storage tank) or temperature of the hot water is increased. Consequently, the amount of hot water is increased and hot water can be stably supplied to the load.

It should be noted that the wording "fuel utilization ratio" means the ratio of the amount of fuel gas that actually contributes to the electrochemical reaction (power generating reaction) to the amount of the fuel gas supplied to the fuel cell. When the amount of the fuel gas supplied to the fuel cell is increased, the fuel utilization ratio decreases.

When the operation temperature of the solid-oxide fuel cell decreases, the controller controls to reduce the fuel utilization ratio in the solid-oxide fuel cell.

Conventionally, there was the following problem. That is, when such a state continuously occurs that the power generation amount decreases and the operation temperature of the fuel cell decreases, the amount of heat recovered from the exhaust heat decreases and the amount of hot water to be supplied to the load also decreases. Accompanying this, when the operation temperature of the fuel cell decreases, the power generation efficiency of the fuel cell decreases. As a result, the maximum power amount suppliable to the electrical load decreases lower than a rating. After that, it takes a considerable long time for the fuel cell to recover the operation temperature again up to a level so that the maximum power amount suppliable to the electrical load generated by the fuel cell reaches the rating and the power generation efficiency is satisfactorily high. As a result, the fuel cell fails to satisfy a sharply increased need for the power of the load. In contrast, according to the present invention, when the operation temperature of the fuel cell decreases, the amount of the fuel gas supplied to the fuel cell is increased and combusted. Thereby, the fuel utilization ratio is reduced and the temperature of the exhaust gas is increased. The heat exchange between the exhaust gas and the water by the heat exchanger is accelerated and the generation amount of hot water is increased, and thus the ratio of the hot water in the hot water storage tank is increased. Furthermore, the water temperature in the hot water storage tank can be raised in a short time, and the operation temperature of the fuel cell is prevented from decreasing largely. Furthermore, the temperature of the fuel cell can be raised in a short time to a temperature at which the maximum power supply can be supplied to the electrical load. Thus, the required power can be swiftly supplied to the load.

Also, when power generation amount of the solid-oxide fuel cell decreases, the controller controls to reduce the fuel utilization ratio of the solid-oxide fuel cell.

When the power amount generated by the fuel cell decreases, the amount of fuel gas supplied to the fuel cell is increased to thereby reduce the fuel utilization ratio. Consequently, the operation temperature of the fuel cell is prevented from decreasing largely. Thus, the fuel cell can swiftly supply the required power. In this case also, since the amount of exhaust heat increases, the generation amount of hot water can be increased and the storage amount of hot water can be increased.

Further, the controller controls to reduce the fuel utilization ratio of the solid-oxide fuel cell during the night.

During the night, in many cases, the load in an ordinary home reaches a minimum used amount of hot water causing a decrease of the operation temperature of the fuel cell. In this case, by controlling to reduce the fuel utilization ratio of the fuel cell, the operation temperature of the fuel cell is prevented from decreasing. Thus, the required power can be swiftly supplied to the load as well as the generation amount of hot water can be increased.

The fuel cell system further includes a switch that allows a user to select to forcibly reduce the fuel utilization ratio of the solid-oxide fuel cell. According to the fuel cell system as described above, when a large amount of hot water is required, by the user of the fuel cell pressing the switch, the generation amount of hot water can be increased in priority to the power generation.

For the fuel cell system of the invention, a fuel cell for domestic use capable of generating power of 1 kW or less, or in particular 750 W or less is appropriately utilized.

The invention enables provision of a fuel cell system that is capable of controlling the fuel utilization ratio in accordance with the amount of hot water used by the user, the ratio or the temperature of hot water in the hot water storage tank and controlling the temperature of the exhaust heat for exchanging heat with water, thereby hot water is stably supplied to a load.

DETAILED DESCRIPTION OF THE INVENTION

The best mode for carrying out the invention will be described below with reference to the drawings. It should be noted that the following description is intended to give an example of the best mode of the invention only. It is easy for a so-called person skilled in the art to modify or alter a part of the invention into another embodiment within the sprit of the invention. Therefore, the following description is not intended to limit the scope of the claims of the invention.

Figure 1:
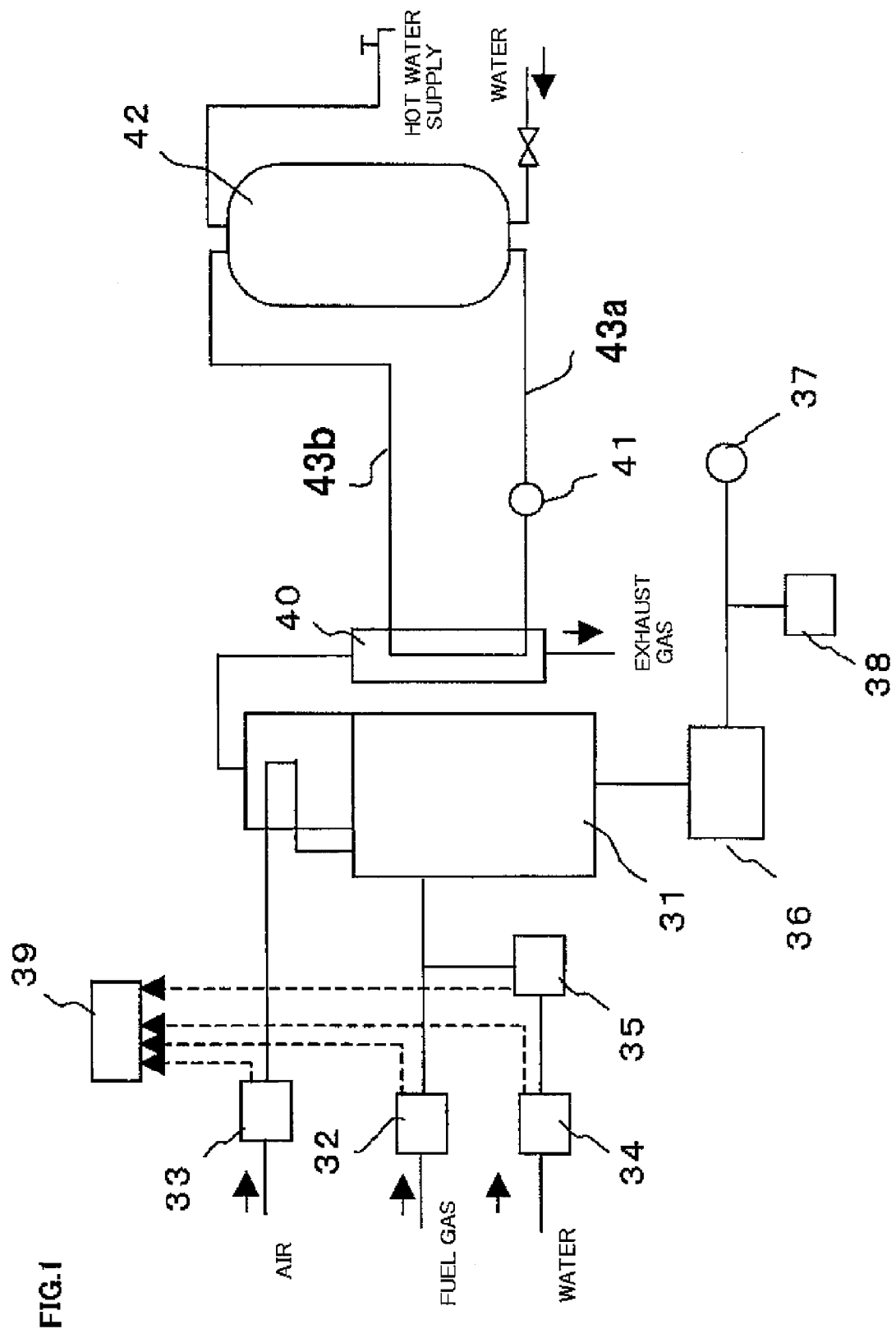
FIG. 1 shows a fuel cell system according to the invention.

FIG. 1 shows a fuel cell system according to the invention. As illustrated in FIG. 1, a fuel cell system of a solid-oxide fuel type of the invention includes a solid-oxide fuel cell 31, a fuel supply device 32 that supplies city gas, natural gas or the like to the fuel cell 31, an air supply device 33 that supplies air as an oxidizing agent to the fuel cell 31, a water supply device 34 that supplies water, and a fuel humidifying device 35 that humidifies a fuel gas supplied to the fuel cell 31. A controller 39 controls the flow rate and the operation of the fuel supply device 32, the air supply device 33, the water supply device 34 and the fuel humidifying device 35.

The fuel cell 31 is connected to a power conditioner 36 that converts generated DC power into AC power. The power conditioner 36 is connected to an electric power system 37 and an electrical load 38. Also, the fuel cell 31 is connected to a heat exchanger 40 that recovers exhaust heat generated due to the power generation. Further, the heat exchanger 40 is connected with circulation pipes 43a and 43b for circulating the water within a hot water storage tank 42. The heat exchanger 40 is also provided with a circulation pump 41 that supplies the water within the circulation pipes 43a and 43b to the heat exchanger 40. The water within the hot water storage tank 42 is supplied to the heat exchanger 40 by the circulation pump 41 from a bottom of the tank 42 through the circulation pipe 43a. The water is heated by the heat exchanger 40 and returned to the top of the tank 42 through the circulation pipe 43b. Within the hot water storage tank 42, the water is separated into hot water and cold water to form a stratification.

When power is not supplied to the electric power system 37; i.e., the electric power generated by the fuel cell 31 is not supplied to a commercial electric power system, the power is generated by the fuel cell 31 depending on the power consumption by the electrical load 38. The controller 39 computes the amount of the fuel gas supplied to the fuel cell 31 based on the output current and fuel utilization ratio of the fuel cell 31 to control the fuel supply device 32. The exhaust gas generated by the fuel cell 31 due to the power generation heats circulating water passing through the heat exchanger 40, and the hot water is reserved in the hot water storage tank 42 for future use.

In order to increase the power generation efficiency, ordinarily the fuel utilization ratio of the fuel cell 31 is set as high as possible. That is, to obtain a prescribed output current, reducing the consumption of the fuel gas as much as possible increases the fuel utilization ratio.

Different from the polymer electrolyte fuel cell 1, the solid-oxide fuel cell 31 is characterized in that the power generation efficiency is higher than the exhaust heat recovery efficiency. Therefore, when the solid-oxide fuel cell 31 is operated in the same manner as the polymer electrolyte fuel cell, a smaller amount of hot water is reserved. Consequently, when the fuel cell is used for obtaining hot water mainly, it may cause a problem. The fuel cell system of the invention is characterized in that, when the use of hot water as the hot-water supply load becomes larger; when the ratio of hot water within the hot water storage tank becomes smaller or when the temperature of the hot water within the hot water storage tank decreases, a smaller fuel utilization ratio can be set. The reason of this is as described below. That is, when the fuel utilization ratio is reduced, although the power generation efficiency decreases, the exhaust heat energy increases by the same amount. As a result, the temperature of the water recovered from the heat exchanger 40 is increased and the amount or temperature of the reserved hot water within the hot water storage tank is increased. For example, when a large amount of hot water is required, the fuel utilization ratio is reduced to thereby increase the energy amount of the exhaust gas generated by the fuel cell. As a result, the amount of the hot water generated by the heat exchanger or the temperature of the hot water within the hot water storage tank is increased; thereby the amount of the hot water within the hot water storage tank and thus the supply amount the hot water can be increased. Even when the power generation efficiency is reduced, the exhaust heat energy thereof can be used for increasing the amount of hot water. Thus, the fuel cell system can be operated efficiently.

Compared to the polymer electrolyte fuel cell, the operation temperature of the solid-oxide fuel cell 31 is higher. Therefore, the operation temperature of the fuel cell 31 itself has to be maintained to a high temperature and heat energy therefor is required. Consequently, by reducing the fuel utilization ratio, such an effect is obtained that the operation temperature of the fuel cell 31 itself also can be maintained at a high temperature. By utilizing the exhaust heat energy, the operation temperature can be efficiently maintained at a high temperature. Thus, the solid-oxide fuel cell 31 swiftly responds to supply a large electric power required for the load.

When the operation temperature of the fuel cell 31 decreases, the controller 39 controls to increase the amount of the fuel gas supplied to the fuel cell 31 to thereby reduce the fuel utilization ratio. The operation temperature of the fuel cell 31 is prevented from being reduced largely, and the generation amount of hot water is increased and thus the storage amount of hot water is increased. When the operation temperature of the fuel cell 31 decreases, the amount of the fuel gas supplied to the fuel cell 31 is increased to thereby reduce the fuel utilization ratio. Thereby, the operation temperature of the fuel cell 31 is prevented from being reduced largely. Therefore, the temperature of the fuel cell 31 can be swiftly increased to a temperature at which the maximum power is supplied to the electrical load. Accordingly, the fuel cell 31 swiftly responds to supply a large electric power required by the load. At this time, compared to the case where the fuel utilization ratio is not reduced, since the amount of exhaust heat increases, the storage amount of hot water can be increased.

This is based on the following principle. That is, when the operation temperature of the fuel cell 31 decreases and the fuel utilization ratio is controlled at a constant level, the heat energy is generally composed of only the heat energy generated by the fuel cell 31 itself and the combustion energy of the remaining fuel gas. Therefore, when the operation temperature is low, internal resistance increases causing a reduction of the maximum amount of the energy from which the electric power is drawn out of. Therefore, the total amount of the energy does not increase, and it takes a considerably long time to obtain a rated electric power. While the operation temperature decreases, the power generation efficiency of the fuel cell 31 and the exhaust heat energy decrease. In such a condition, the fuel gas to be supplied to the fuel cell 31 is increased to thereby reduce the fuel utilization ratio. Thus, the combustion energy of the remaining fuel is increased and thereby the fuel cell 31 swiftly reaches a temperature at which the maximum electric power is supplied to the electrical load. At this time, compared to the case where the fuel utilization ratio is not reduced, the amount of exhaust heat increases resulting in an increase of the storage amount of hot water.

The operation temperature of the fuel cell 31 can be detected with a temperature sensor disposed adjacent to the fuel cell 31. The fuel cell includes a solid electrolyte sandwiched between an air electrode and a fuel electrode. Air is supplied to the air electrode and fuel gas is supplied to the fuel electrode, and excess fuel gas is combusted and the exhaust gas is generated.

Also, when the electrical power outputted by the fuel cell 31 decreases, the controller 39 controls to increase the amount of the fuel gas supplied to the fuel cell 31 to thereby reduce the fuel utilization ratio. Thereby, the operation temperature of the fuel cell 31 is prevented from reducing largely, resulting in an increase of the storage amount of the hot water. The reason of this is as described below. That is, when the electrical power generated by the fuel cell 31 decreases, since the fuel cell 31 does not supply the electric power to the electric power system, the power generation is reduced corresponding to the reduction of the electrical power. When the fuel utilization ratio is maintained at a constant level, the operation temperature of the fuel cell 31 decreases. Since the power generation efficiency of the fuel cell 31 decreases until the operation temperature is increased again, the outputable maximum electric power decreases resulting in a reduction of the storage amount of hot water. However, at this time, by controlling to reduce the fuel utilization ratio, the above problems can be solved. That is, when the electrical power output from the fuel cell 31 decreases, the amount of the fuel gas supplied to the fuel cell 31 is increased to thereby reduce the fuel utilization ratio. Thereby, the operation temperature of the fuel cell 31 is prevented from reducing largely. At this time also, since the amount of exhaust heat increases, the storage amount of hot water is increased.

Further, the controller controls to reduce the fuel utilization ratio of the fuel cell 31 during the night. Generally, in many cases, the electrical power consumption in a domestic load becomes the minimum level at night, resulting in a reduction of the operation temperature of the fuel cell. At this time, by controlling to reduce the fuel utilization ratio of the fuel cell, the operation temperature of the fuel cell can be prevented from decreasing. Thus, required electric power is swiftly supplied and the generation amount of the hot water is increased.

Furthermore, there is provided a switch that allows a user to select to forcibly reduce the fuel utilization ratio of the fuel cell. When the user of the fuel cell wants a large amount of hot water, by pressing the switch, the generation amount of the hot water can be increased in priority to the power generation.

Figure 2:
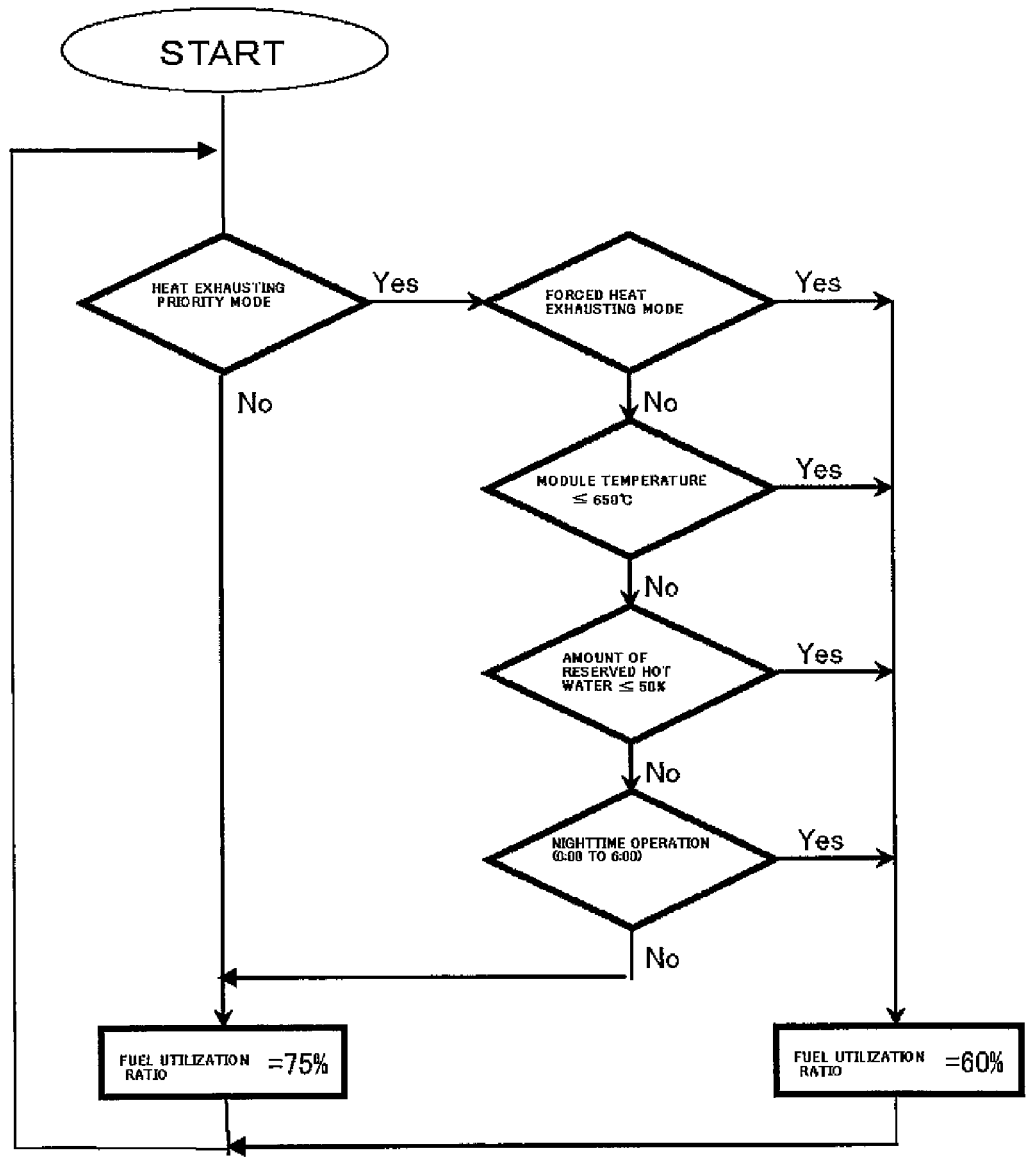
FIG. 2 is a flowchart showing an example of a sequence to determine the fuel utilization ratio.
Figure 3:
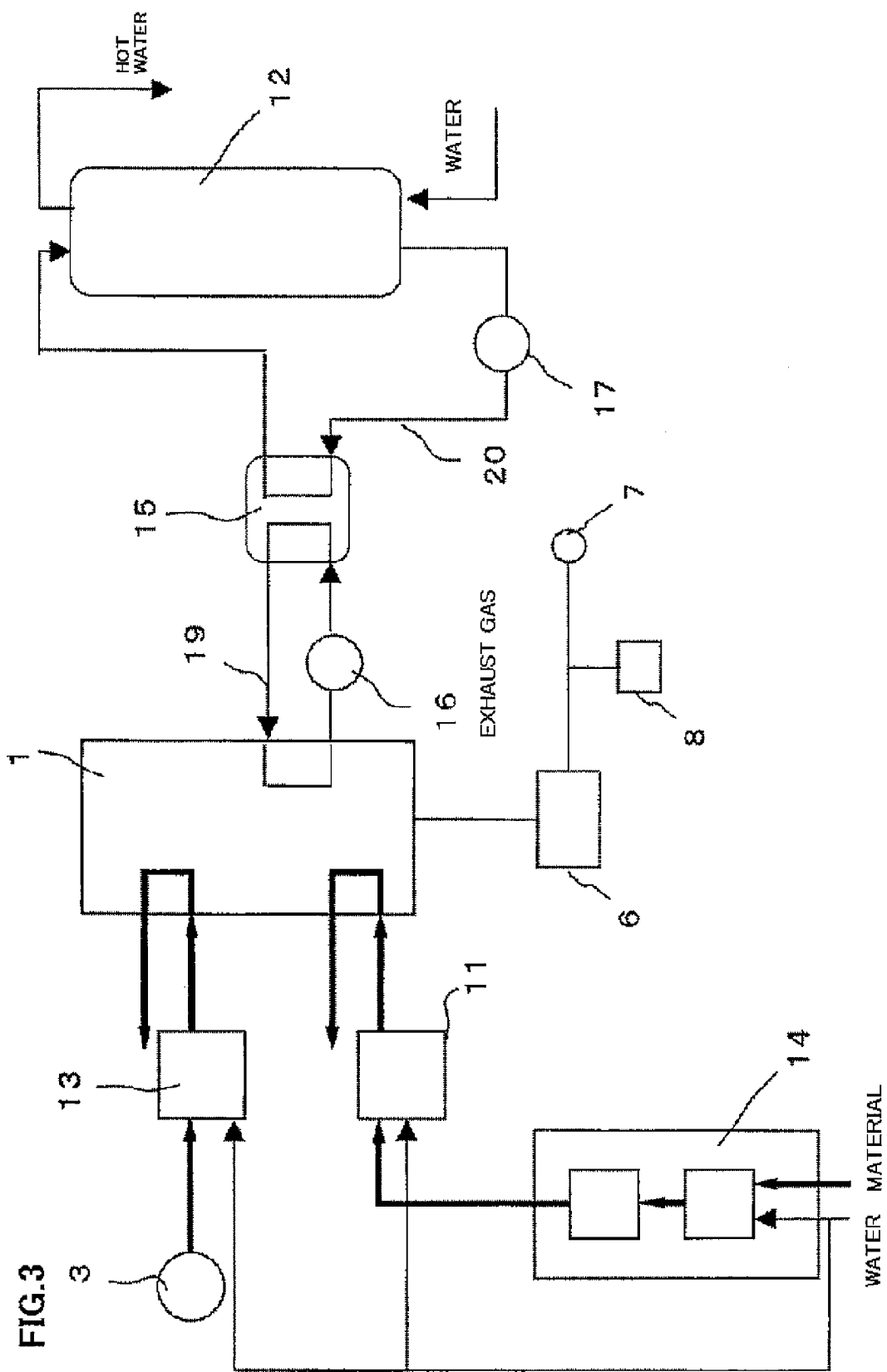
FIG. 3 shows a conventional polymer electrolyte fuel cell system.

FIG. 2 shows an example of a practical sequence to determine the fuel utilization ratio. In FIG. 2, as an example, the fuel utilization ratio of ordinary operation is set to 75%. In the determination process of the fuel utilization ratio, first of all, it is determined whether a heat exhausting priority mode that reduces the fuel utilization ratio is effective.

The mode can be set by providing, for example, a heat exhausting priority mode switch to the controller 39 of the fuel cell 31. Or, a remote control (not shown) may be provided to the controller 39, and a heat exhausting priority mode switch may be provided to the remote control.

The heat exhausting priority mode may be automatically made to be effective based on the usage condition of hot water in a home, the ratio or the temperature of hot water in the hot water storage tank or the module temperature (operation temperature) during power generation of the fuel cell 31. The determination of the automatic switching of the heat exhausting priority mode may be made, for example, once a week based on the following conditions. That is, the total amount of use of hot water exceeds a specific amount or total time of a state that the module temperature decreases below a specific temperature exceeds a specific value. The heat exhausting priority mode may be switched off by continuously detecting a determination condition and based on the following conditions. That is, during the determination period, when the total amount of use of hot water is below a specific amount or when the total time of a state that the module temperature is below a specific temperature has not reached a specific value.

When the heat exhausting priority mode is not effective, the power generation operation is carried out at 75%, which is the fuel utilization ratio during ordinary operation. When the heat exhausting priority mode is effective, it is determined whether the mode is a forced heat-exhausting mode. The forced heat-exhausting mode is a mode in which the fuel cell system operates under an operation condition that the fuel utilization ratio is constantly lowered irrespective of the operation state. This mode is effective in a case that, in the consumption amount of hot water in a home, the hot water runs out extremely frequently.

The forced heat-exhausting mode also can be set with a switch (forced heat-exhausting mode switch) provided to the controller 39 (and the remote control) that allows the user to select a reduction of the fuel utilization ratio of the solid-oxide fuel cell. By carrying out the power generation operation in the forced heat exhaust mode, the storage amount of hot water is increased more than the ordinary power generation.

Subsequently, the internal temperature (operation temperature) of the module of the fuel cell 31 is determined. When the module temperature decreases, for example, 750° C., which is the ordinary operation temperature, to 650° C. or less, the power generation operation is carried out with the fuel utilization ratio reduced to 60%. In this operation mode, the storage amount of hot water is increased and the module temperature of the fuel cell 31 is prevented from being reduced largely. Thus, the temperature of the fuel cell can be swiftly increased to a temperature at which the maximum power can be supplied to the electrical load. Further, since the load of a temperature cycle on the fuel cell 31 is reduced, such an effect can be obtained that the life of the fuel cell 31 is increased. In the above example, the determination based on the module temperature is controlled in a single step. However, multiple temperature determination steps may be provided to control the fuel utilization ratio in multiple steps. When the module temperature decreases from, for example, 750° C., which is the ordinary operation temperature, to 700° C. and 650° C., the fuel utilization ratio may be controlled at the respective temperature steps. In this case, the amount of the fuel gas can be controlled more minutely than the single step control in accordance with the state of the fuel cell. Therefore, the fuel gas can be prevented from being consumed excessively and thus more effective control is achieved.

Subsequently, the storage amount of hot water in the hot water storage tank 42 is determined. When the ratio of hot water (for example, hot water of 40° C. or more) in the hot water storage tank is, for example, 50% or less, the power generation operation is carried out with the fuel utilization ratio reduced to 60% or less. When the power generation operation is carried out with this operation mode, the storage amount of hot water can be increased more than the ordinary power generation. In the above example, the determination of the storage amount of hot water is controlled in a single step. However, the fuel utilization ratio may be controlled in multiple steps to determine the storage amount of hot water. In this case, the amount of the fuel gas can be controlled more minutely than the single step control in accordance with the state of the fuel cell. Therefore, the fuel gas can be prevented from being consumed excessively and more effective control is achieved.

Subsequently, the operation time is determined. When the operation time is night (for example, from 24:00 to 6:00), the power generation operation is carried out with the fuel utilization ratio reduced to 60%. In many cases, in an ordinary home, the load is continuously maintained at the minimum state during the night. In this state, the module temperature of the fuel cell 31 decreases. By reducing the fuel utilization ratio, the amount of the supplied fuel gas is increased to thereby prevent the module temperature from decreasing largely. The module temperature can be increased in a short time to a temperature at which the fuel cell can supply the maximum power to the electrical load. Also, at this time, since the exhaust heat energy increases, the amount of hot water in the hot water storage tank 42 can be increased.

In the above sequence to determine the fuel utilization ratio, although the fuel utilization ratio is uniformly controlled to be reduced to 60%, the fuel utilization ratio may be set in the range of 50 to 70%. The fuel utilization ratio may be changed based on the respective determination condition, for example, based on the forced heat exhausting mode or module temperature.

As described above, the fuel utilization ratio during power generation of the solid-oxide fuel cell is variably controlled. Thereby, the production amount and the storage amount of hot water can be effectively increased as well as the operation temperature of the fuel cell can be increased.

In the above-described sequence, as shown in FIG. 2, the determination is continuously carried out. Thereby, even when the operation state changes, the operation can be carried out in accordance with the operation state.

In FIG. 2, after carrying out the first-step determination whether the heat exhausting priority mode is effective, the second determination of the forced heat-exhausting mode is carried out. However, in the case of the heat exhausting priority mode, even when the fuel utilization ratio is reduced without carrying out the second step determination of the forced heat-exhausting mode, the hot water can be stably supplied to the hot water load.

What is claimed is:

1. A fuel cell system, comprising:
a solid-oxide fuel cell;
a fuel supplier for supplying fuel gas to the solid-oxide fuel cell;
a heat exchanger that exchanges heat between exhaust gas exhausted from the solid-oxide fuel cell and water;
a hot water storage tank that reserves the water;
circulation pipes that allow the water to circulate between the hot water storage tank and the heat exchanger;
a circulation pump provided to the circulation pipes; and
a controller;
wherein, when a used amount of hot water in the hot water storage tank exceeds a predetermined amount, the controller is programmed to control the operation of the fuel supplier to increase an amount of a fuel gas supplied to the solid-oxide fuel cell and to reduce a fuel utilization ratio of the solid-oxide fuel cell.

2. A fuel cell-system, comprising:
a solid-oxide fuel cell;
a fuel supplier for supplying fuel gas to the solid-oxide fuel cell;
a heat exchanger that exchanges heat between exhaust gas exhausted from the solid-oxide fuel cell and water;
a hot water storage tank that reserves the water;

circulation pipes that allow the water to circulate between the hot water storage tank and the heat exchanger;

a circulation pump provided to the circulation pipes, and a controller;

wherein, when a ratio of hot water to cold water in the hot water storage tank decreases less than a predetermined ratio or when a temperature of hot water in the hot water storage tank decreases less than a predetermined temperature, the controller is programmed to control the operation of the fuel supplier to increase an amount of a fuel gas supplied to the solid-oxide fuel cell and to reduce a fuel utilization ratio of the solid-oxide fuel cell.

3. The fuel cell system according to claim 1, wherein when an operation temperature of the solid-oxide fuel cell decreases, the controller is programmed to control the fuel supplier to reduce the fuel utilization ratio in the solid-oxide fuel cell.

4. The fuel cell system according to claim 2, wherein when an operation temperature of the solid-oxide fuel cell decreases, the controller is programmed to control the fuel supplier to reduce the fuel utilization ratio in the solid-oxide fuel cell.

5. The fuel cell system according to claim 1, wherein when a power generation amount of the solid-oxide fuel cell decreases, the controller is programmed to control the fuel supplier to reduce the fuel utilization ratio of the solid-oxide fuel cell.

6. The fuel cell system according to claim 2, wherein when a power generation amount of the solid-oxide fuel cell decreases, the controller is programmed to control the fuel supplier to reduce the fuel utilization ratio of the solid-oxide fuel cell.

7. The fuel cell system according to claim 1, wherein the controller is programmed to control the fuel supplier to reduce the fuel utilization ratio of the solid-oxide fuel cell during the night.

8. The fuel cell system according to claim 2, wherein the controller is programmed to control the fuel supplier to reduce the fuel utilization ratio of the solid-oxide fuel cell during the night.

9. The fuel cell system according to claim 1, further including a switch that causes forcible reduction of the fuel, utilization ratio of the solid-oxide fuel cell by a user's selection.

10. The fuel cell system according to claim 2, further including a switch that causes forcible reduction of the fuel utilization ratio of the solid-oxide fuel cell by a user's selection.

* * * * *